United States Patent
Bond et al.

(10) Patent No.: US 7,010,411 B2
(45) Date of Patent: Mar. 7, 2006

(54) REAR PRESSURE CONTROL AND DYNAMIC REAR PROPORTIONING IN A VEHICLE BRAKE SYSTEM

(75) Inventors: James R. Bond, Centerville, OH (US); Daniel N. Borgemenke, Springboro, OH (US); Matthew A. Cukovecki, New Carlisle, OH (US); David F. Reuter, Beavercreek, OH (US); William F. Borchers, Beavercreek, OH (US); Jeffrey T. Vondervellen, Centerville, OH (US); Jerry L. Newton, Richmond, IN (US); Michael J. Check, Ann Arbor, MI (US); Joseph A. Elliott, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 239 days.

(21) Appl. No.: 10/624,056

(22) Filed: Jul. 21, 2003

(65) Prior Publication Data

US 2005/0021210 A1    Jan. 27, 2005

(51) Int. Cl.
*B60T 7/12* (2006.01)
(52) U.S. Cl. ............... 701/78; 701/71; 303/167
(58) Field of Classification Search ........... 180/244; 701/78, 79, 80; 303/140, 166, 167, 147, 303/113.1, 121
See application file for complete search history.

(56) References Cited

U.S. PATENT DOCUMENTS

| 4,790,607 | A | 12/1988 | Atkins | 303/109 |
| 4,886,322 | A | 12/1989 | Atkins | 303/149 |
| 4,991,103 | A | 2/1991 | Lin | 701/73 |
| 5,487,596 | A | 1/1996 | Negrin | 303/149 |
| 6,193,327 | B1 | 2/2001 | Atkins | 303/113.1 |
| 6,241,326 | B1 | 6/2001 | Ferguson et al. | 303/177 |
| 6,290,312 | B1 * | 9/2001 | Atkins | 303/154 |
| 6,357,836 | B1 * | 3/2002 | Schmitt et al. | 303/113.5 |
| 6,357,840 | B1 | 3/2002 | Atkins | 303/149 |
| 6,398,321 | B1 | 6/2002 | Atkins | 303/158 |
| 6,546,324 | B1 | 4/2003 | Chen et al. | 701/48 |

* cited by examiner

*Primary Examiner*—Thomas G. Black
*Assistant Examiner*—Christine M. Behncke
(74) *Attorney, Agent, or Firm*—Michael D. Smith

(57) ABSTRACT

An apparatus and method are provided for operating a pump-less rear wheel anti-lock brake system of a vehicle using speed sensors on at least one front and one rear wheel, to provide a true dynamic rear proportioning (DRP) function, and to significantly enhance braking performance in rear wheel anti-lock mode through better management of the volume of pressurized fluid supplied by the master cylinder using rear pressure control (RPC).

71 Claims, 9 Drawing Sheets

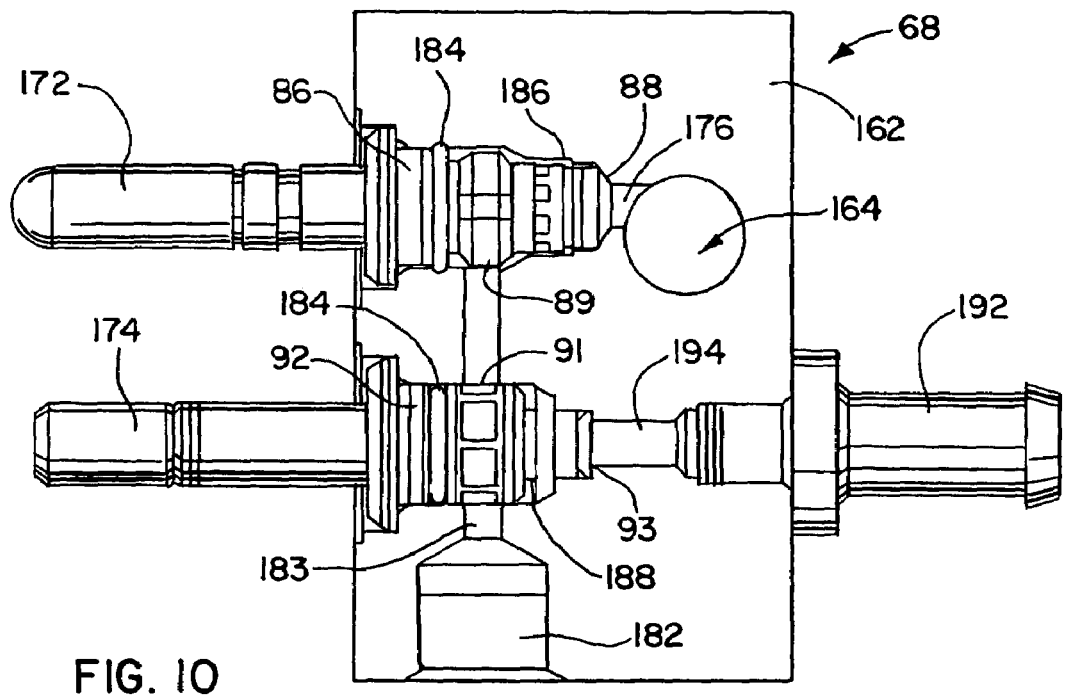
FIG. 10
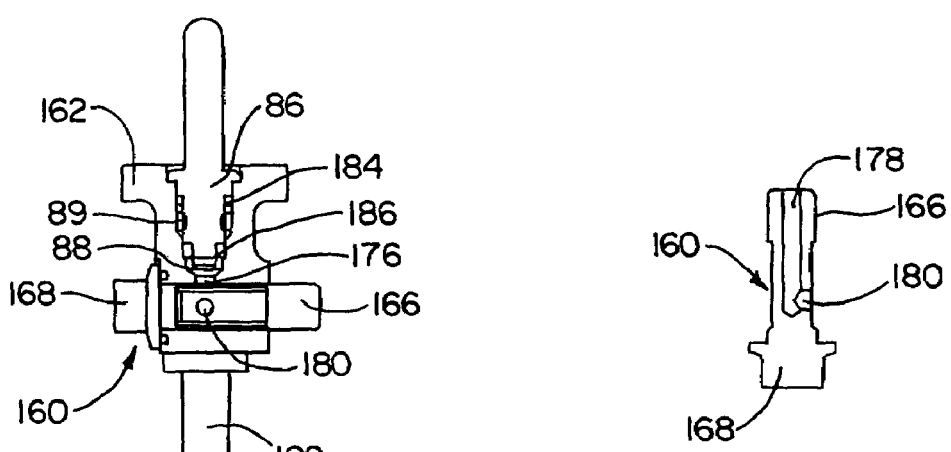
FIG. 11
FIG. 12

REAR PRESSURE CONTROL AND DYNAMIC REAR PROPORTIONING IN A VEHICLE BRAKE SYSTEM

TECHNICAL FIELD OF THE INVENTION

This invention relates to brake systems for vehicles, and more particularly to rear wheel anti-lock brake systems where pressurized fluid is provided by a master cylinder during both normal and anti-lock braking events.

BACKGROUND OF THE INVENTION

Maintaining directional control while stopping a four-wheeled vehicle skidding on a slippery surface, or in a panic stop situation where the vehicle operator is applying excessive pressure to the brake pedal, requires attention to a number of interrelated problems including: getting the vehicle stopped in a reasonable distance; maintaining steering control; and controlling a condition known as yaw, where the rear wheels of the vehicle break loose before the front wheels and the rear end of the vehicle swings around toward the front of the vehicle. If yaw is not controlled, the rear end of the vehicle may swing far enough around toward the front to cause the vehicle to spin, slide sideways into an obstacle, or even overturn.

Vehicles such as light trucks, which routinely operate with only minimal weight over the rear wheels when they are not carrying a load, present special problems for brake designers in dealing with yaw. The rear brakes must be capable of stopping the truck in a required distance, as specified in government regulations, while carrying a full load and operating at the full gross vehicle weight of the truck. When the truck is operating empty, however, because there is so little weight over the rear wheels, the rear wheels tend to break loose from the driving surface under much lighter brake loads than do the rear wheels of vehicles, such as passenger cars, where the vehicle weight is more evenly distributed to the front and rear wheels.

Modern all-wheel anti-lock (AWAL) brake systems provide improved directional stability in stopping a vehicle in a skidding situation. Such AWAL brake systems typically include an electronic control unit (ECU) that receives wheel speed signals from speed sensors on the front and rear wheels. The ECU detects the impending onset of wheel lock-up by monitoring the speed of the wheels. When an impending lock-up is detected, the ECU takes control of the AWAL brake system, and rapidly pulses the brakes to prevent the brakes from locking the wheels, so that some measure of control is retained even if the braking surface is too slippery to allow normal braking.

When an impending lock-up is detected, the ECU actuates an AWAL isolation valve to close off the hydraulic connection between the brakes and the master cylinder in the base brake system, and the AWAL brake system takes over control of the brakes. A circulation pump in the AWAL brake system takes the place of the master cylinder during the operation of the AWAL brake system, and supplies a continual flow of pressurized hydraulic fluid to the brakes through apply and release valves that are opened and closed at a rapid rate by the ECU to cause the fluid pressure in the brakes to pulsate and allow a staccato rotation of the wheel. By rapidly opening and closing the apply and release valves in this manner, the brake pressure applied to the wheels can be modulated and closely controlled to maintain wheel slip within precise limits to optimize stability, steerability and stopping distance of the vehicle.

Another function typically performed by an AWAL brake system is known as dynamic rear proportioning (DRP). In performing DRP, the ECU will monitor and compare the speeds of the front and rear wheels, and control the AWAL apply and release valves in a manner that limits the pressure applied to the rear brakes to a value proportionally lower than the pressure applied to the front brakes, so that the rear brakes will always be slipping a predetermined amount in relation to the front brakes. The object of DRP is to promote enhanced directional stability through yaw reduction during braking by ensuring that the rear wheels never lock up before the front wheels. Because the AWAL brake system continually monitors the speed of the front and rear wheels during DRP operation, the AWAL system can detect differences in stopping performance of a vehicle such as a light truck when it is operating empty or carrying a load, and adjust the proportion of brake pressure applied to the front and rear wheels accordingly.

Such AWAL brake systems with DRP add considerable complexity and cost to the brake system, due to the necessity for the pump and associated controls. This additional cost and complexity has precluded installation of four-wheel ABS systems as standard equipment on all four-wheeled vehicles.

For the last several decades, however, a significant percentage of light trucks and vans that are not equipped with an AWAL brake system have been equipped with pump-less anti-lock brake systems that operate only on the rear wheels of the vehicle. In the automotive industry, such systems are sometimes known as rear wheel anti-lock (RWAL) brake systems. These systems have been shown to offer significant improvements in directional stability during braking at a lower cost than a full AWAL brake system, because RWAL systems have fewer and less costly components than AWAL brake systems.

The following U.S. patents disclose examples of prior RWAL brake systems and methods for operating such systems: U.S. Pat. No. 4,790,607 to Atkins, et al; U.S. Pat. No. 4,886,322 to Atkins; U.S. Pat. No. 4,991,103 to Lin; U.S. Pat. No. 5,487,596 to Negrin; U.S. Pat. No. 6,193,327 B1 to Atkins; U.S. Pat. No. 6,241,326 B1 to Ferguson, et al; U.S. Pat. No. 6,357,840 B1 to Atkins; and U.S. Pat. No. 6,398,321 B1 to Atkins.

As shown in FIG. 1, an RWAL brake system 10 typically includes a pedal actuated master cylinder 12 having a primary piston supplying a first volume of pressurized hydraulic brake fluid to a front brake circuit 14 connected to brakes on the left and right front wheels of the vehicle, and a secondary piston supplying second volume of pressurized hydraulic fluid to a rear brake circuit 16 to the left and right rear wheels of the vehicle. The rear brake circuit 16 includes a normally open apply valve 18, a normally closed release valve 20, a fluid storage element in the form of an accumulator 22, and a differential pressure switch 24.

The apply valve 18 has an inlet connected to the master cylinder 12 and an outlet connected to the rear brakes. The release valve 20 has an inlet connected to the rear brakes and an outlet connected to the accumulator 22. The differential pressure 24 switch is operatively connected to sense the difference between the pressure in the rear brake circuit 16 at the inlet of the apply valve 18, as supplied by the master cylinder 12, and the pressure in the rear brakes, and to generate an electrical signal when a predetermined pressure differential is detected.

The RWAL system typically includes a single wheel speed sensor 26 attached to monitor speed of a component 28, such as a rotating gear or shaft in the transmission or the differential, of the power train connecting the rear wheels of the vehicle to the engine. The single rear wheel speed sensor 26 generates a signal that is indicative of, or proportional to, an average speed of the left and right rear wheels. The RWAL system also typically includes a brake switch 30, connected to the brake pedal or the linkage leading to a vacuum booster attached to the master cylinder 12, that generates a signal indicating that the driver has depressed the brake pedal and initiated a braking event. The RWAL system may also include other sensors, such as the fluid level sensor 32 shown in FIG. 1, for performing other diagnostic and control functions.

The RWAL system further includes an electronic control unit ECU 34 connected to the apply valve 18, the release valve 20, the single wheel speed sensor 26, the brake switch 30, and the differential pressure switch 24. The ECU 34 of the RWAL system receives the signals generated by the single wheel speed sensor 26, the brake switch 30, and the differential pressure switch 24 as input signals that are processed by the ECU 34, according to analytical functions programmed into the ECU 34, to determine if RWAL operation is required during a braking event. If RWAL operation is required, the ECU 34 generates output signals for controlling the apply valve 18 and release valves 20 during RWAL operation according to control functions programmed into the ECU 34.

In general, the ECU 34 of an RWAL system controls the apply and release valves 18, 20 during RWAL operation according to various hold and release sequences that allow the ECU 34 to detect when the rear wheels are experiencing a lock-up condition, and to control the rear brakes during RWAL operation.

To reduce pressure in the rear brakes during RWAL operation, the apply valve 18 is closed to isolate the master cylinder 12 from the rear brakes, and the release valve 20 is opened to allow a portion of the pressurized fluid originally supplied to the rear brakes by the master cylinder 12 to bleed off through release valve 20. The fluid released from the rear brakes through the release valve 20 is stored in the accumulator 22, and is returned to the master cylinder following the braking event, when the driver's foot is removed form the brake pedal, through a pair of check valves 36,38 connected to allow flow from the outlet to the inlet of the apply valve 18 and release valve 20 respectively. In actual operation, the apply and release valves 18, 20 are not simply opened or closed once in a braking event, but are rather pulsed open and closed at a rapid rate by the ECU 34 during RWAL operation.

Because there is no circulation pump in an RWAL brake system for providing a continuous flow of pressurized hydraulic brake fluid, as there would be with a full AWAL brake system, the maximum volume of pressurized fluid available to the rear brake circuit 16 of the RWAL brake system 10 is limited to the volume of fluid that is supplied to the rear brake circuit 16 by a single apply stroke of the master cylinder 12. As a result, RWAL operation will terminate when the accumulator 22 is full, or when a maximum allowable portion of the volume of fluid supplied by the master cylinder 12 has been bled into the accumulator 22. The ECU 34 will terminate RWAL operation and allow the rear wheels to lock up, or apply braking force with whatever residual pressure is available to the rear brakes from the master cylinder 12, when the signals received from the differential pressure switch 24 indicate that the accumulator 22 is full.

While it would seem logical at first consideration that one could indefinitely continue RWAL operation by providing an accumulator 22 capable of storing a large volume of fluid, this is not the case, due to the limited volume of pressurized fluid available from the master cylinder 12 for use during any given braking event. Furthermore, where the front brakes are not capable, without some contribution from the rear brakes, of providing sufficient braking force to meet government standards for minimum stopping distance, the maximum allowable volume of fluid that can be bled off into the accumulator during RWAL operation will be less than the total volume of pressurized fluid supplied by the master cylinder 12 during the braking event. Where the government standards for minimum stopping distance cannot be met without the rear brakes, RWAL operation must be discontinued when the remaining pressure in the rear brakes has dropped to a minimum value required to provide the braking force needed to augment the braking force generated by the front brakes.

It will be clear to those skilled in the art that, because there is no pump in an RWAL brake system for continually supplying and re-circulating pressurized fluid, as there would be in an AWAL brake system, one must adopt a different mindset when designing an RWAL brake system, and be very stingy about how the limited volume of pressurized fluid available from the master cylinder 12 is utilized during RWAL operation.

Unfortunately, prior RWAL brake systems having only a single rear wheel speed input must utilize a portion of this limited volume of pressurized fluid for periodically performing hold and release cycles to gather data needed for determining if the rear wheels are truly experiencing a lock-up condition, and for determining when the RWAL cycle should be terminated during a given braking cycle, such as, for example, because the rear wheels having passed over a slippery patch of road surface that caused initiation of the RWAL cycle, or because the wheels have slowed enough to re-engage whatever surface they may be traversing, or that braking pressure from the master cylinder 12 has been reduced to a level that lock-up will not occur, or that the RWAL cycle must be aborted during the remainder of the braking cycle because the limited volume of fluid available from the master cylinder 12 has been transferred to the accumulator 22. The pressurized fluid wasted in performing these functions reduces the length of time that the brake system can operate in RWAL mode, and limits the effectiveness of the RWAL system during a given braking event.

In addition, the re-apply time between subsequent RWAL brake operations is affected by factors such as the temperature and volume of the fluid in the accumulator 22, and residual pressure in the rear brakes, that must bleed back to the master cylinder 12 through the rear brake circuit 16, between subsequent braking events. Periodically performing hold and release cycling of the rear brakes to determine if RWAL operation is needed, and for control during RWAL operation can undesirably lengthen the re-apply time.

It is also not possible in prior RWAL brake systems 10 to perform true dynamic rear proportioning (DRP). Because prior RWAL brake systems 10 do not utilize front wheel speed, all information relating to vehicle speed must be deduced from instantaneous rear wheel speed signals provided by the rear wheel sensor 26.

Some prior RWAL systems have included a conventional hydraulic proportioning valve 17, of the type used for several decades in vehicles with standard brake systems, and in some vehicles with various types of controlled braking systems, to provide brake proportioning at a fixed rate. These systems do not provide DRP, because the brake proportioning is not dynamically controlled by the RWAL.

As shown in FIG. 1, for RWAL systems using such conventional hydraulic proportioning valves, the valve 17 is located in the rear brake circuit. The hydraulic proportioning valve 17 has an inlet 17a connected to the master cylinder 12, to receive pressurized fluid therefrom, and an outlet 17b connected to deliver the pressurized fluid from the master cylinder 12 to the rear brakes, through the apply valve 18.

A typical pressure profile curve for a conventional hydraulic proportioning valve 17 is shown in FIG. 2, with the horizontal axis representing the front brake pressure and the vertical axis representing rear brake pressure. The rear pressure tracks and is equal to the front pressure in the region labeled 5 until a "knee" "A" is reached. Beyond the knee "A" the increase in pressure applied to the rear brakes is limited to a fixed proportion of the pressure increase applied to the front brakes, as shown by the region labeled 7, by a spring-biased mechanism in the hydraulic proportioning valve 17, in a manner well known in the art.

U.S. Pat. No. 6,241,326 B1, to Ferguson, et al, discloses a system and method for electronically controlling an RWAL system in a manner that emulates the performance of a conventional fixed-rate hydraulic proportioning valve, using a process that Ferguson calls electronic brake proportioning (EBP), in an RWAL system that does not include a hydraulic proportioning valve. When operating in the EBP mode, Ferguson uses the RWAL ECU 34 to control the isolation valve 18 in a manner that provides a pressure profile curve that approximates the curve shown in FIG. 2.

Ferguson uses signals from a rear wheel speed sensor, and/or a g-sensor, to identify when the vehicle has reached the same predetermined static deceleration threshold, i.e. the knee of the pressure profile curve, (see, for example, point A at 0.55 g on FIGS. 3 and 4) that would be utilized to initiate conventional brake proportioning, if the RWAL brake system on the vehicle included a conventional hydraulic proportioning valve. As shown by the dashed 45° line 106, in FIGS. 2 and 3, at g-levels below the predetermined static brake threshold of 0.55 g at point A, the EBP function of Ferguson applies brake pressure equally to the front and rear brakes. Once the predetermined deceleration threshold, A at 0.55 g, is reached with the RWAL operating in the EBP mode, a subroutine in the RWAL control algorithm of Ferguson controls an isolation valve 18 to hold the pressure in the rear brake circuit at a constant value as the front brake pressure continues to increase. The EBP system periodically opens the isolation valve 18, according to a pre-programmed schedule, to distribute further brake pressure increases in open-loop stepwise fashion in increments of 0.1 g as the vehicle reaches higher deceleration thresholds (see points B at 0.65 g and C at 0.75 g) to approximate an idealized proportioning curve, as shown by curves 108 and 110 in FIGS. 2 and 3 respectively that emulates a pressure profile curve for a conventional hydraulic proportioning valve.

The EBP function of Ferguson does not provide 'dynamic' rear proportioning, but rather uses a pre-set routine of open and hold cycles of the isolation valve that may be wasteful of the limited volume of hydraulic fluid available from the master cylinder 12, and may also result in either under or over braking of the rear wheels under conditions where the pre-set routine of open and hold cycles is not optimal for the current operating conditions being experienced by the vehicle.

What is needed, therefore, is an improved apparatus and method for providing and operating a pump-less rear wheel anti-lock brake system, that addresses one or more of the problems described above.

SUMMARY OF THE INVENTION

Our invention provides an improved apparatus and method for operating a pump-less rear wheel anti-lock brake system through the use of speed sensors on at least one front and one rear wheel, or an averaged rear wheel speed signal from a transmission or driveline differential, to provide a true DRP function, and to significantly enhance braking performance in anti-lock mode through better management of the volume of pressurized fluid supplied by the master cylinder using a process called rear pressure control (RPC).

In one form of our invention, a rear brake pressure control (RPC) apparatus is provided for a rear brake hydraulic circuit including a fluid storage element, and a master cylinder, supplying a volume of pressurized brake fluid to the rear brakes during a braking cycle in a pump-less anti-lock brake apparatus controlling the rotational speeds of only the rear brakes of a vehicle having left and right front and rear wheels and front and rear brakes acting on the front and rear wheels respectively, during a braking cycle. The RPC apparatus includes a hydraulic control unit (HCU) and an electrical control unit (ECU). The HCU operatively connects the master cylinder to the rear brakes and the fluid storage element for controlling fluid pressure applied to the rear brakes during the braking cycle and fluid flow to and from the fluid storage element. The ECU operatively connects to the HCU for controlling the HCU as a function of the rotational speeds of at least one front and one rear wheel.

The RPC apparatus may include a first wheel speed sensor operatively connected for sensing a speed of at least one front wheel and sending a front wheel speed signal to the ECU, and a second speed sensor operatively connected for sensing a speed of at least one rear wheel, or the average speed of both rear wheels, and sending the rear wheel speed signal to the ECU. The first wheel speed sensor may be connected to one of the left or right front wheels in a vehicle having more than one front and/or rear wheel, and the RPC apparatus may further include a third wheel sensor connected to the other of the left and right front wheels for sensing the speed of the other of the left and right front wheels.

The HCU may include an apply valve and a release valve. The apply valve is a normally open valve operatively connected to the ECU to be controlled thereby, and having an inlet connected to the master cylinder for receiving pressurized fluid therefrom and an outlet connected to the rear brakes. The release valve is a normally closed valve operatively connected to the ECU to be controlled thereby, and having an inlet connected to the rear brakes for receiving fluid therefrom and an outlet connected to the fluid receiving element. The fluid receiving unit may be an accumulator disposed in the HCU, or alternatively a fluid reservoir supplying fluid to the master cylinder.

The RPC apparatus may be mounted on the master cylinder. The master cylinder may include a threaded port for connecting the master cylinder to the rear brake hydraulic system, and the HCU may have an internal passage connected to the inlet of the apply valve, with the HCU being mounted on the master cylinder by a hollow fastener extending through the internal passage of the HCU and engaging the threaded port. The hollow fastener has an internal bore providing fluid communication with the master cylinder and a cross-drilled hole intersecting the internal bore for passage of fluid to and from the internal passage of the HCU. The fluid receiving element may be an accumulator disposed in the HCU in fluid communication with the outlet of the release valve. Alternatively, the fluid receiving element may be a fluid reservoir mounted on the master cylinder for supplying fluid to the master cylinder, with the outlet of the release valve being connected in fluid communication with the fluid reservoir. Where the fluid receiving element is a fluid reservoir mounted on the master cylinder, the fluid reservoir includes a hose connection snorkel for passage of fluid to and from the fluid reservoir, the HCU includes a hose connection snorkel in fluid communication with the outlet of the outlet of the release valve, and a hose connects the snorkels on the HCU and the fluid reservoir.

Our invention may also take the form of a method for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having left and right front and rear wheels and front and rear brakes acting on the front and rear wheels respectively. The method includes controlling fluid pressure applied to the rear brakes during the braking cycle and fluid flow to and from the fluid storage element as a function of the rotational speeds of at least one front and one rear wheel. The method may further include reducing the pressure applied to the rear brake circuit in proportion to the pressure applied to the front wheel, to thereby provide a true dynamic rear proportioning (DRP) function.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIGS. 10–12 are partial cross sections of components of the RPC apparatus shown in FIG. 9.

DETAILED DESCRIPTION

Figure 1:
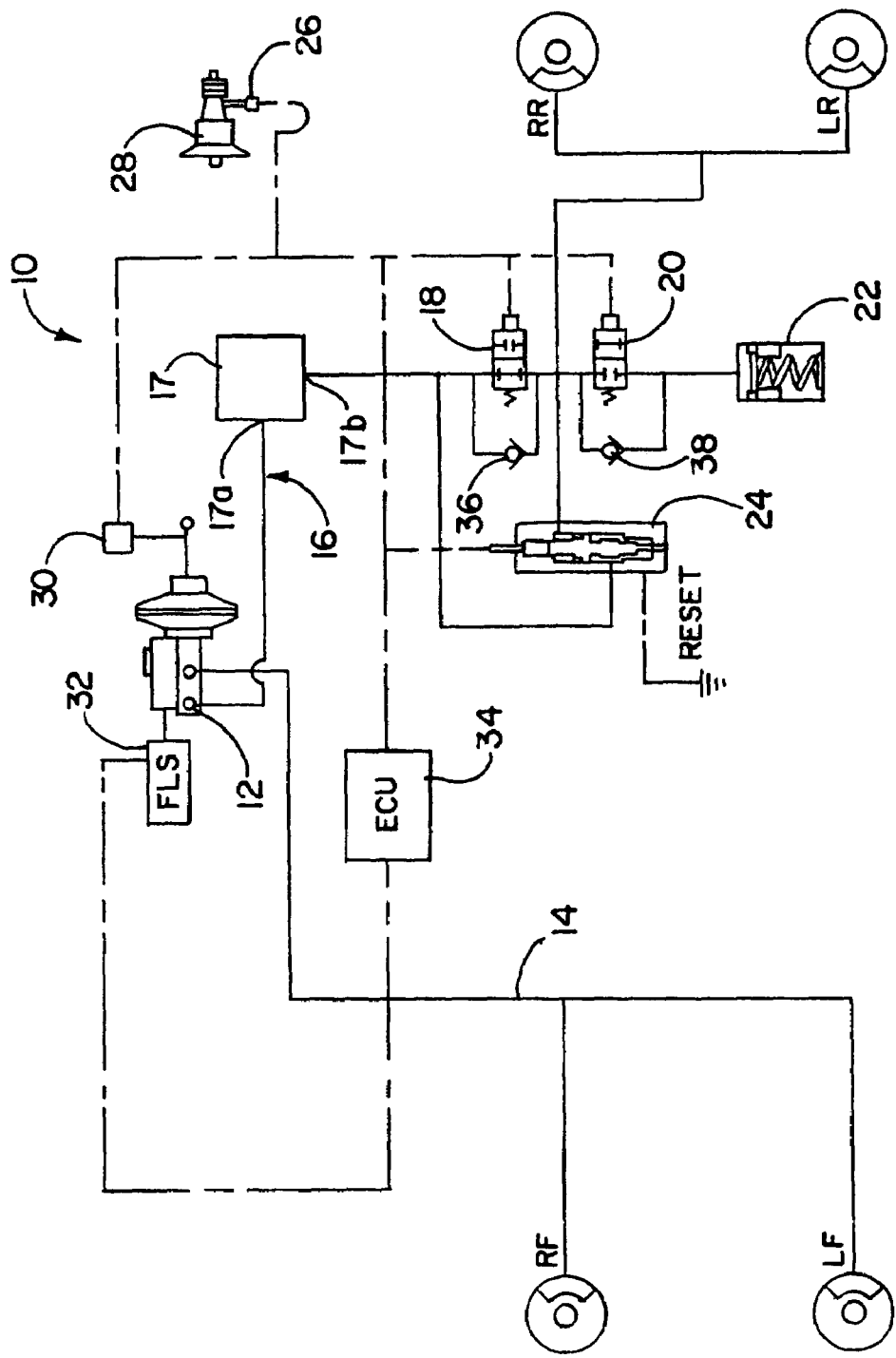
FIG. 1 is a schematic representation of a prior RWAL brake apparatus.
Figure 2:
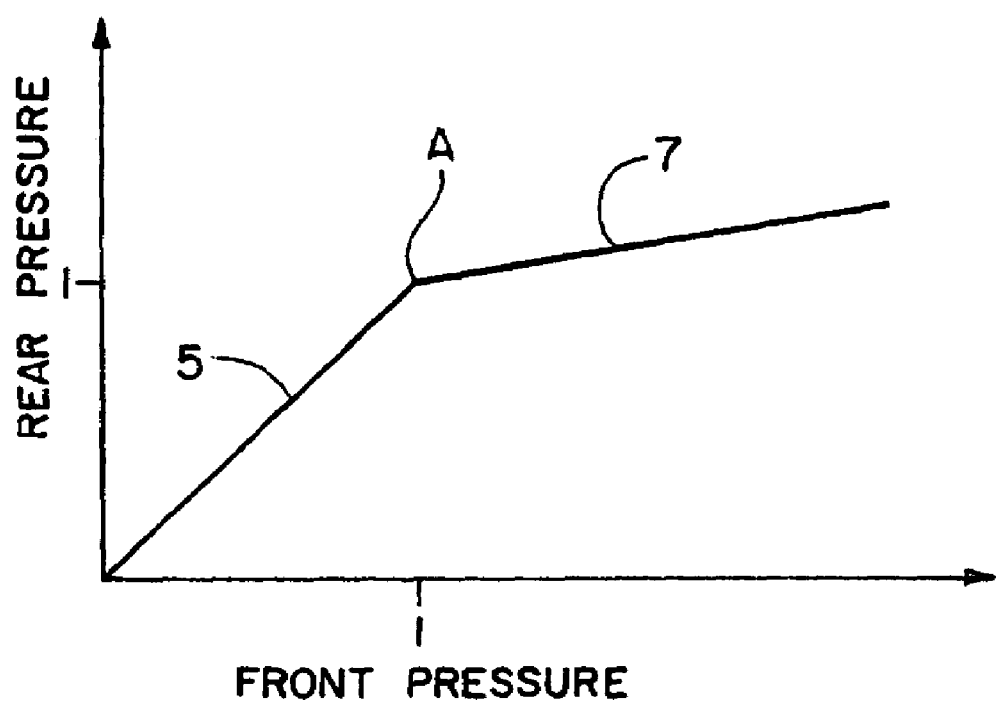
FIG. 2 is a graphical representing operation of a prior hydraulic proportioning valve.
Figure 3:
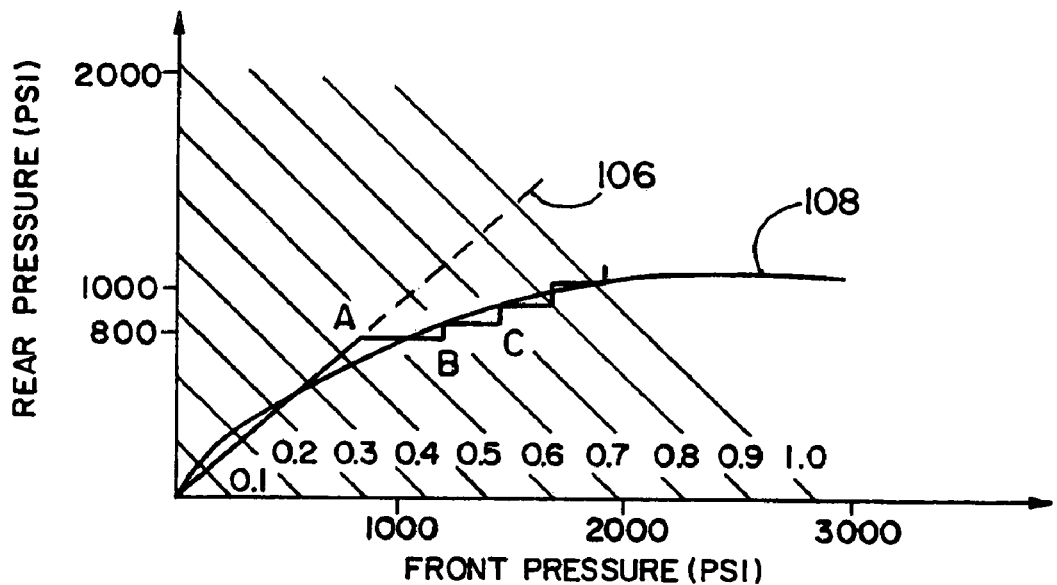
FIGS. 3 and 4 are graphs representing operation of a prior RWAL brake apparatus having an electronic brake proportioning (EBP) subroutine as part of the RWAL operating algorithm.
Figure 4:
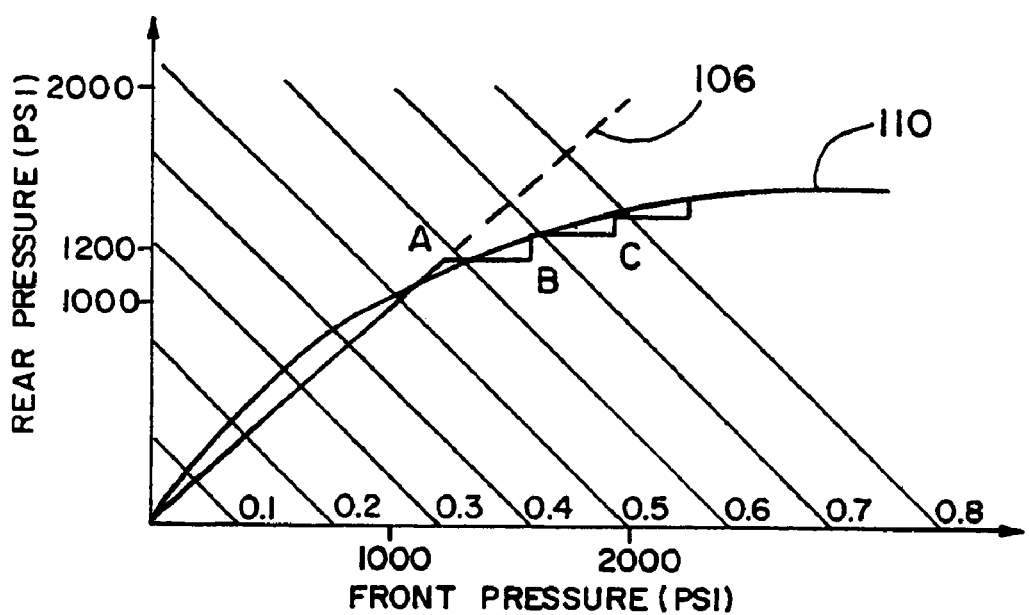
Figure 5:
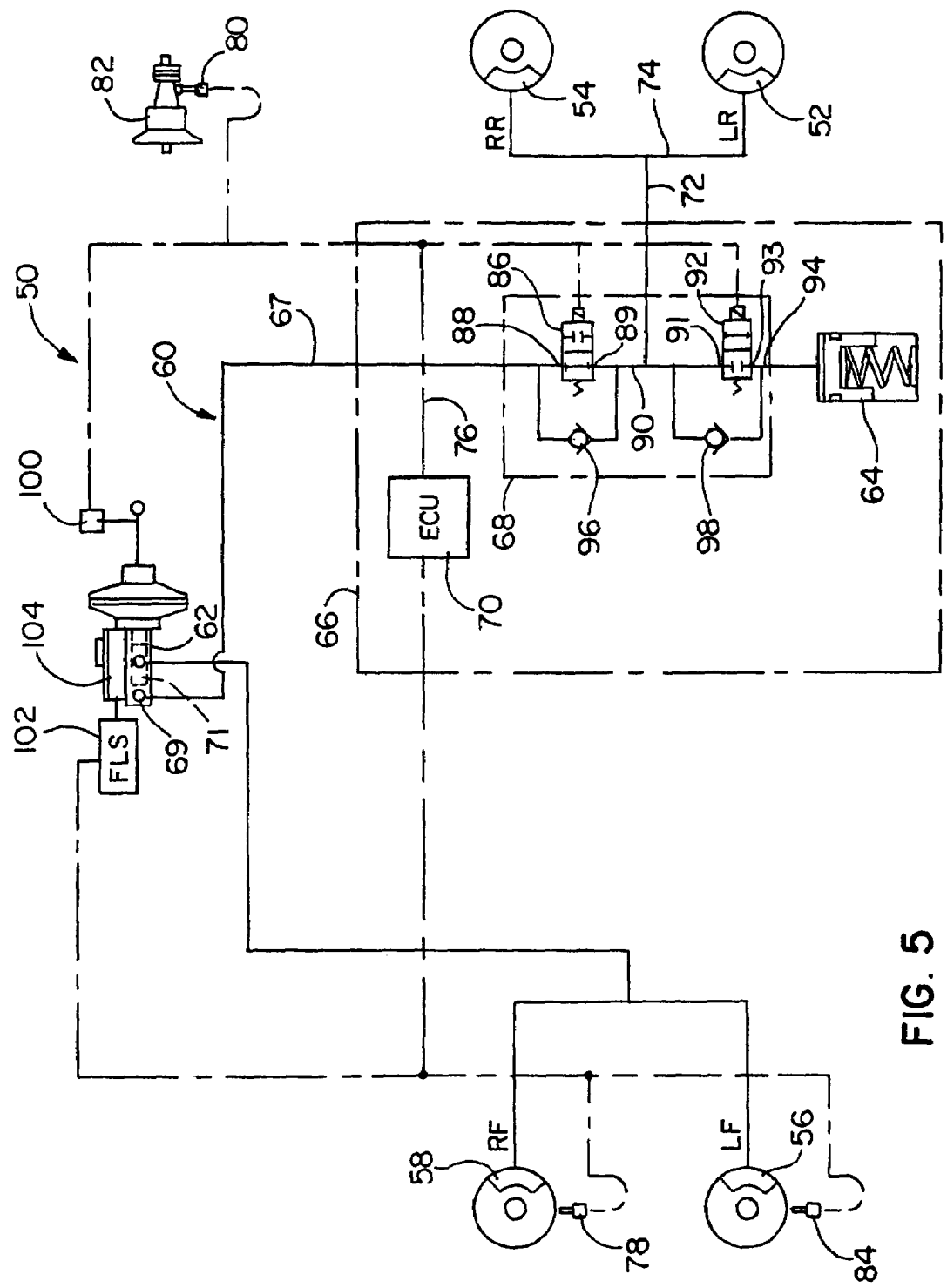
FIG. 5 is a schematic representation of a first embodiment of a brake apparatus according to the present invention including a rear pressure control (RPC) apparatus having a fluid accumulator, for storing fluid during rear pressure control (RPC) and dynamic rear proportioning (DRP) operation according to the present invention.

FIG. 5 shows a first exemplary embodiment of a pump-less anti-lock brake apparatus 50 for controlling the rotational speeds, during a braking cycle, of only the rear brakes 52, 54 of a vehicle having left and right front and rear wheels and front 56, 58 and rear brakes 52, 54 acting on the front and rear wheels respectively. The pump-less anti-lock brake apparatus 50 includes a rear brake hydraulic circuit 60, including a master cylinder 62 for supplying a volume of pressurized brake fluid to the rear brakes 52, 54 during the braking cycle, a fluid storage element in the form of an accumulator 64, and a rear brake pressure control (RPC) apparatus 66.

The RPC apparatus 66 includes a hydraulic control unit (HCU) 68 and an electrical control unit (ECU) 70. The HCU 68 is connected by a brake line 67 to a rear brake port 69 in fluid communication with a secondary piston 71 of the master cylinder 62. The HCU is also connected via brake lines 72, 74 to the rear brakes 52, 54, and by a conduit 94 to the fluid storage element 64, for controlling fluid pressure applied to the rear brakes 52, 54 during the braking cycle, and fluid flow to and from the fluid storage element 64. The ECU 70 is operatively connected, as indicated by dashed lines 76 to the HCU 68 for controlling the HCU 68 as a function of the rotational speeds of at least one front and one rear wheel.

The RPC apparatus 66 further includes a first wheel speed sensor 78 operatively connected for sensing a speed of one of the front wheels and sending a front wheel speed signal to the ECU 70, and a second speed sensor 80 operatively connected for sensing a speed of at least one of the rear wheels and sending rear wheel speed signal to the ECU 70. In the first exemplary embodiment shown in FIG. 5, the second speed sensor 80 is connected to a rear wheel drive train component, in the form of a rotating component of the transmission or rear wheel differential 82.

In the RPC apparatus 66 of the first exemplary brake apparatus 50 as shown in FIG. 5, the first wheel speed sensor 78 is connected to one of the left or right front wheels, in this case the right front wheel, and the RPC 66 apparatus further comprises a third wheel sensor 84 connected to the other of the left and right front wheels, in this case the left front wheel, for sensing the speed of the of the left front wheel. Our invention may be practiced with one front wheel speed sensor 78, but is preferably practiced with two front wheel sensors 78, 84, one for each front wheel, to provide an enhanced degree of control precision, as described in more detail below. It similar fashion, our invention may be practiced with one rear wheel speed sensor 80, as shown in FIG. 5, which averages the wheel speeds of the two rear wheels by using the output shaft speed of the transmission 82, or with individual sensors (not shown) on each of the rear wheels. Where the second speed sensor 80 is provided in the form of a single rear wheel speed sensor 80 attached to a rear wheel drive train component 82, as shown in FIG. 5, the rear wheel speed sensed may be an average speed value for the rear wheels.

The HCU 68 of the first exemplary embodiment includes an apply valve 86 and a release valve 92, connected to the ECU 70 to be controlled thereby. The apply valve 86 is a normally open valve having an inlet 88 connected via the line 67 to the master cylinder 62, for receiving pressurized fluid from the secondary piston 71. An outlet 89 of the apply valve 86 is connected to the rear brakes 52, 54 via lines 72 and 74, and an internal passage 90 of the HCU 68. The release valve 92 is a normally closed valve having an inlet 91 connected via the internal passage 90, and lines 72, 74 to the rear brakes 52, 54 for receiving fluid from the rear brakes

52, 54. An outlet 93 of the release valve 92 is connected, via a line or a second internal passage 94 in the HCU 68, to the accumulator 64.

The HCU 68 further includes a first and a second check valve 96, 98. The first check valve 96 is operatively connected between the inlet and outlet 88, 89 of the apply valve 86, for blocking fluid flow from the inlet to the outlet 88, 89 of the apply valve 86, and for passage of flow from the outlet to the inlet 89, 88 of the apply valve 86. The second check valve 98 is operatively connected between the inlet and outlet 91, 93 of the release valve 92, for blocking fluid flow from the inlet to the outlet 91, 93 of the release valve 92, and for passage of flow from the outlet to the inlet 93, 91 of the release valve 92.

The brake apparatus 50 further includes a position sensor in the form of a brake switch 100, and fluid level sensor 102. The brake switch is operatively connected between the master cylinder 62 and the ECU 70, for sensing that a braking event has been initiated by a vehicle operator depressing a brake pedal, to generate fluid pressure in the master cylinder 62. The fluid level sensor 102 is operatively connected between a fluid reservoir 104 of the master cylinder 62 and the ECU 70 for sending system diagnostic information to the ECU 70.

Figure 6:
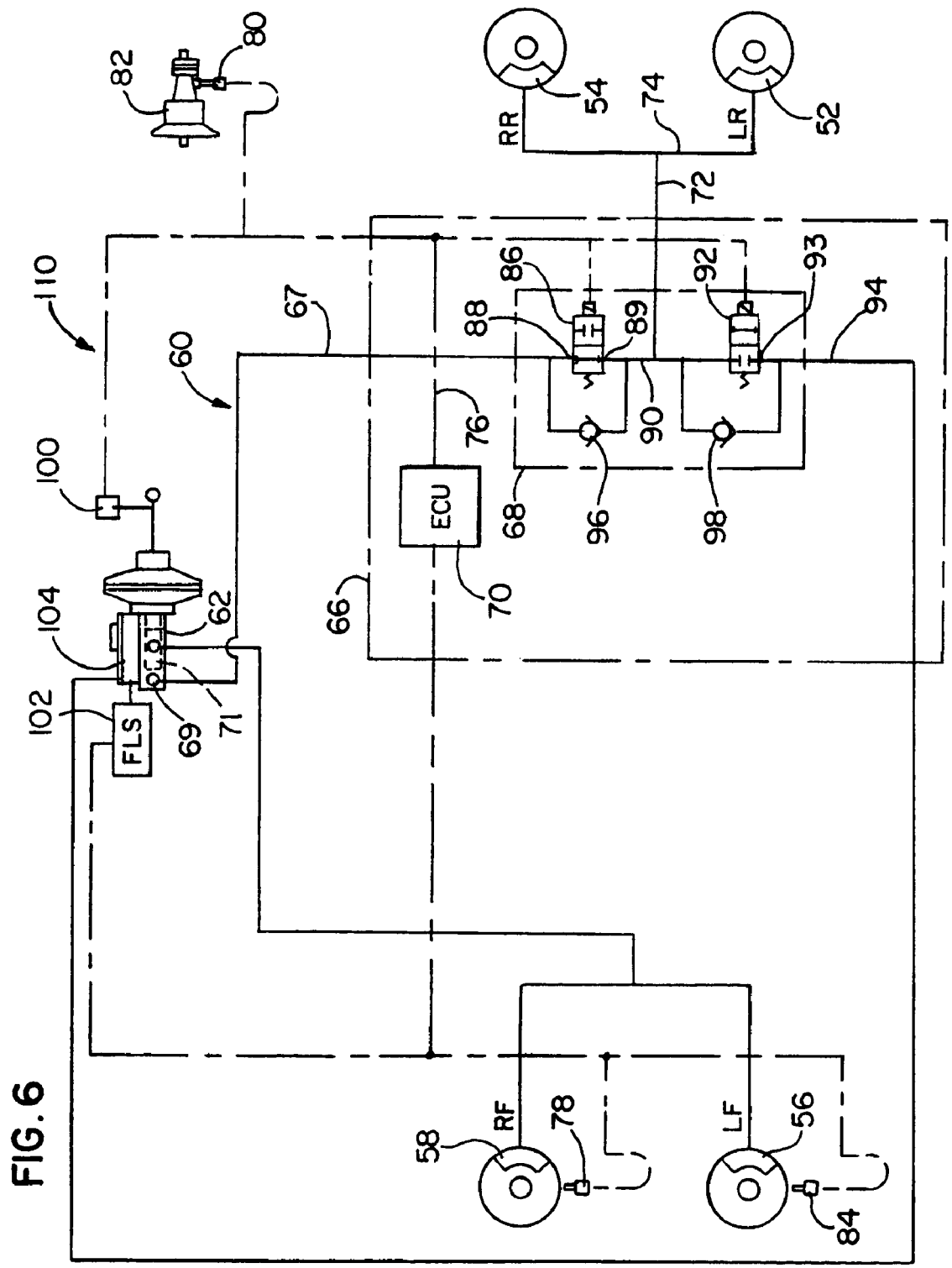
FIG. 6 is a schematic representation of a second embodiment of a brake apparatus according to the present invention including a fluid reservoir, for storing fluid during RPC and DRP operation according to the present invention.

FIG. 6 shows a second exemplary embodiment of a pump-less anti-lock brake apparatus 110, according to our invention, in which the accumulator 64 of the first exemplary embodiment 50 is eliminated, and the line 94 from the outlet 93 of the release valve 92 is connected directly in fluid communication with the fluid reservoir 104. In all other respects, the second exemplary embodiment 110 is identical to the first exemplary embodiment 50.

By connecting the outlet 93 of the release valve 92 directly to the fluid reservoir 104, as shown in FIG. 6, the entire volume of the fluid reservoir 104 is available for receiving fluid released by the release valve 92 during operation of the brake apparatus 110. As a result, the total fluid volume that can be released during a given braking event is therefore limited only by the displacement of the portion of the master cylinder 62 supplying fluid to the rear hydraulic circuit 60. Connecting the release valve 92 for direct return of fluid to the fluid reservoir 104 in this manner, and thereby eliminating the accumulator 64, not only simplifies and reduces the cost of the brake apparatus 110, but also significantly improves performance over brake systems that are limited by the amount of fluid that can be released into the accumulator 64.

Figure 7:
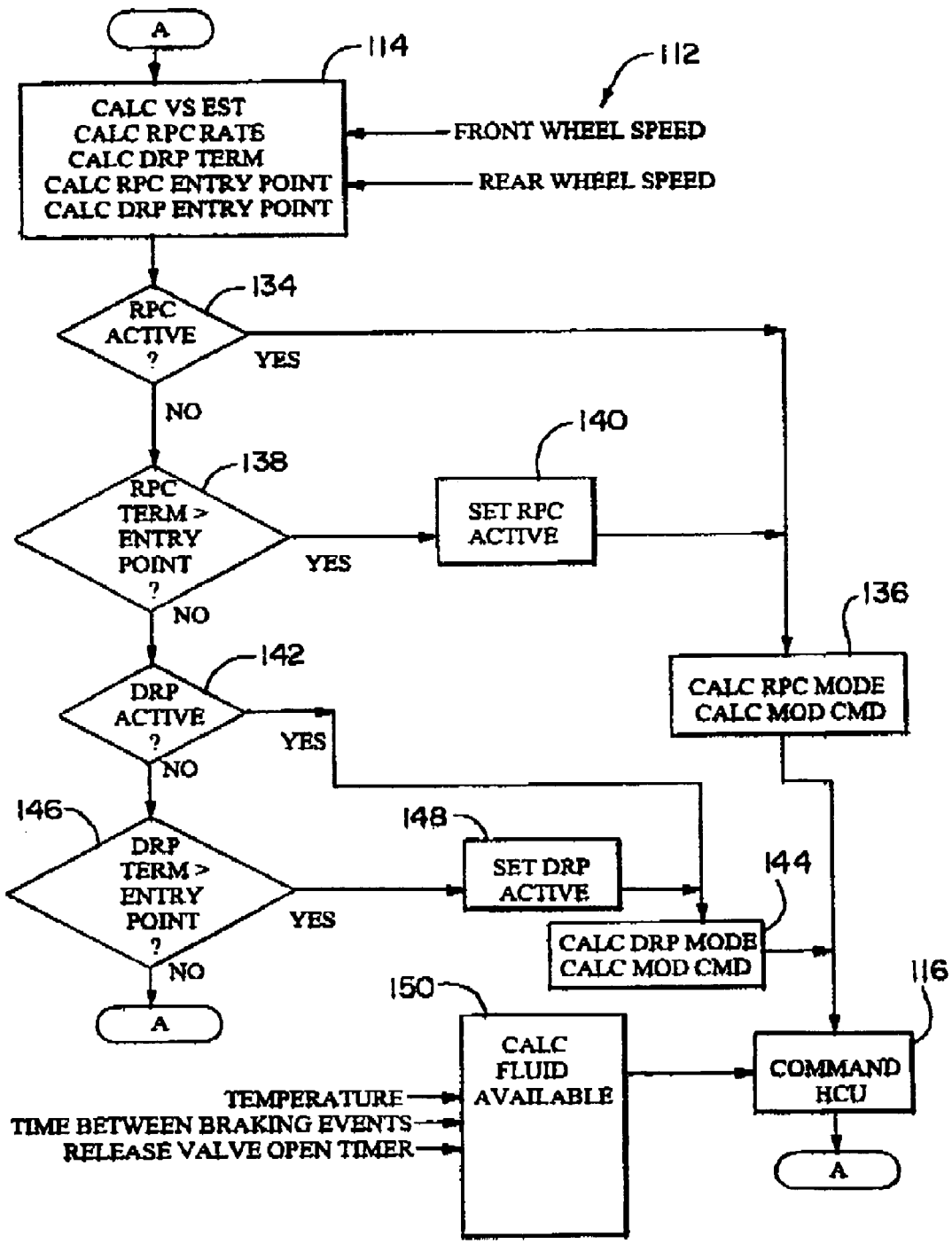
FIGS. 7 and 8 are block diagrams of a method for performing RPC and DRP, according to the present invention.
Figure 8:
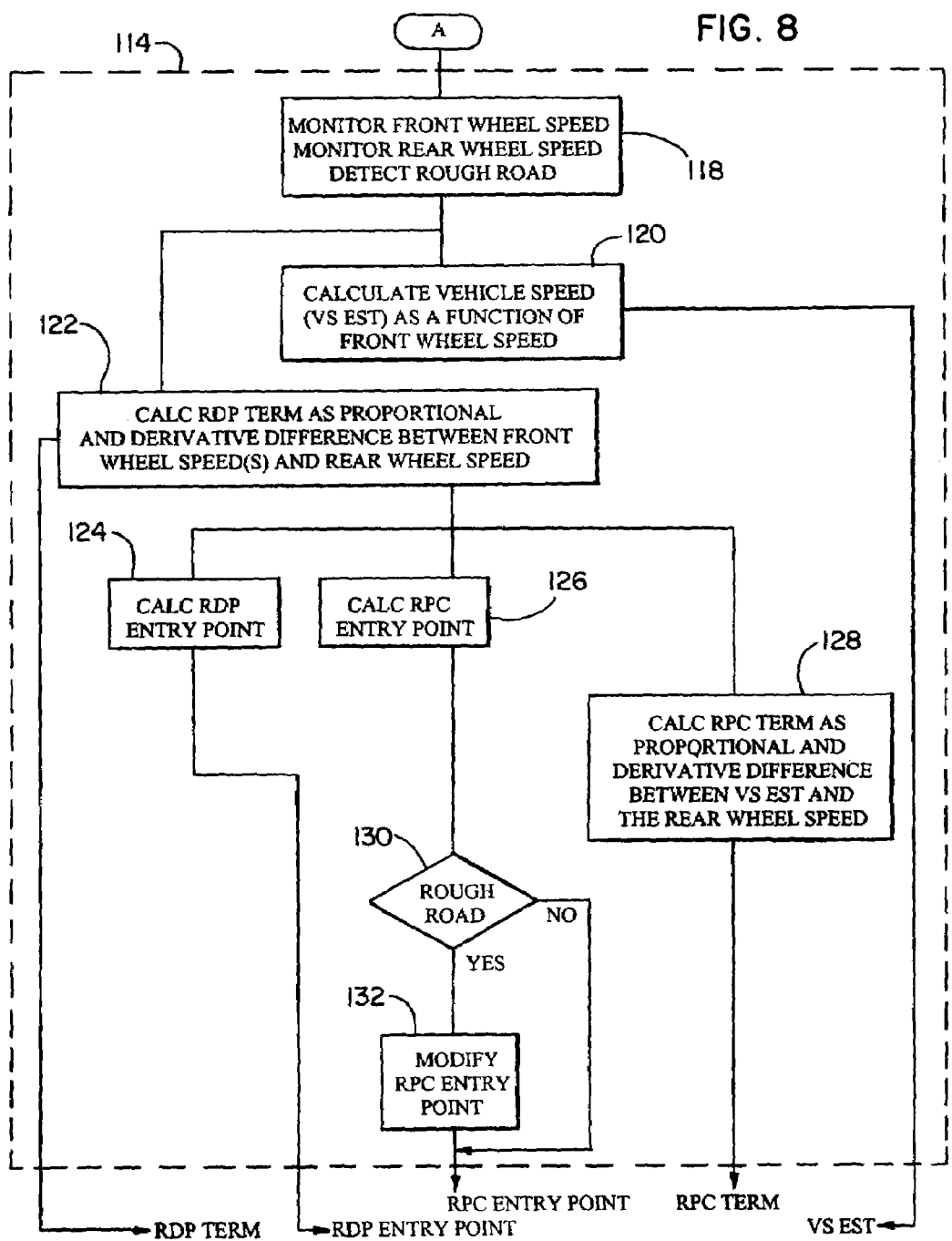

An exemplary method 112 for operating the first and second exemplary embodiments 50, 110 is illustrated in FIGS. 7 and 8. As shown at block 114 in FIGS. 7 and 8, the ECU 70 continually monitors the front and rear wheel speeds, as detected by the right and left front wheel speed sensors 78, 84 and the rear wheel speed sensor 80, and calculates five values that are used by the ECU 70 for generating a command to the HCU 68, as shown at block 116 of FIG. 7, for controlling the HCU 68 as a function of the rotational speeds of at least one front wheel and one rear wheel. These five values are: an estimated vehicle speed (VS Est), calculated as a function of the front wheel speed; a DRP entry point, calculated as a function of vehicle speed (VS Est); a DRP term, calculated as a function of the front wheel speeds and rear wheel speed; an RPC entry point, calculated as a function of the vehicle speed (VS Est); and an RPC term, calculated as a function of vehicle speed (VS Est) and rear wheel speed.

As shown at block 118, in FIG. 8, in addition to calculating the five values described above, the ECU 70 also makes a determination with regard to the type of surface on which the vehicle is operating, from the front and rear wheel speed signals. Where a rough road surface is detected, the ECU 70 modifies the RPC entry point, generally in a manner delaying entry into RPC. In one embodiment of the invention, the ECU 70 monitors noise on the wheel speed signals generated by the wheel speed sensors 78, 84, 80. When the vehicle is operating on a smooth road surface, the signals received from the wheel speed sensors 78, 84, 80 exhibit only a small noise component. As the road surface becomes progressively rougher, the noise component increases. The ECU 70 makes use of this noise component to estimate the type of surface that the vehicle is operating on, and if necessary, modifies the RPC entry point to compensate for the road surface in the command generated at block 116 for controlling the HCU 68.

As shown in block 120 of FIG. 8, (VS Est) is calculated as a function of front wheel speed. In a vehicle having multiple front wheels, an average of the front wheel speeds may be used. In preferred embodiments of the invention, all available wheel speed signals are used for calculating (VS Est) and detecting the rough road condition, with the signals from the front wheel speed sensors 78, 84 being given more weight than the signal from the rear wheel speed sensor 80, because the signals from the front wheels will not be affected by RPC and DRP control of the rear brakes 52, 54 by the HCU 68. In four wheel drive vehicles, it is preferred that the vehicle be shifted into a rear wheel drive mode before performing RPC and/or DRP operation according to the invention, so that the front wheels will be rolling on the surface, to thereby obtain the most accurate calculation of estimated vehicle speed (VS Est), by using a heavily weighted value of front wheel speed in calculating (VS Est). If the vehicle is left in four-wheel drive, the accuracy of the measured speed of the front wheels may be affected by their being driven, and possibly slipping on the surface.

Although the DRP term and entry point can be calculate in any suitable manner, the exemplary method 112 includes calculating the DRP term as a proportional and derivative difference between the front wheel speed and the rear wheel speed, as shown at block 122 of FIG. 8, and calculating the DRP entry point as a function of the vehicle speed (VS Est), as shown at block 124.

In similar fashion, although the RPC term and RPC entry point can be calculated in any suitable manner, the exemplary embodiment 112 includes calculating the RPC entry point as a function of vehicle speed (VS Est), as shown at block 126, and calculating the RPC term as a function of vehicle speed and rear wheel speed, as shown at block 128 of FIG. 8. The method 112 further includes modifying the RPC entry point as a function of a rough road condition, if a threshold rough road condition is exceeded, as indicated by decision diamond 130 and block 132.

During a braking event, the ECU 70 continually iterates at a rapid rate through the steps of the method 112, as shown in FIG. 7, using the five values discussed above, which are also continually updated, as shown in FIG. 8. As shown at diamond 134, if RPC is already active, the ECU 70 will use the five values to calculate whether the brake apparatus 50, 110 should continue in RPC mode, and if so what commands should be given to the HCU 68 for controlling the apply and release valves 86, 92, as shown at block 136.

If RPC is not active, the ECU 70 determines if the RPC term is greater than the RPC entry point, as shown at diamond 138. If The RPC term is greater than the RPC entry point, the ECU 70 sets an 'RPC ACTIVE' flag, as shown in block 140, and proceeds to block 136, as shown in FIG. 7.

If the RPC term is not greater than the RPC entry point, as determined at diamond 138, the ECU 70 determines whether or not DRP is already active, as shown at diamond 142. If DRP is already active, the ECU 70 will use the five values to calculate whether the brake apparatus 50, 110 should continue in DRP mode, and if so what commands should be given to the HCU 68 for controlling the apply and release valves 86, 92, as shown at block 144.

If DRP is not already active, as determined at diamond 142, the ECU 70 determines whether or not the DRP term is greater than the DRP entry point, as shown at diamond 146. If the DRP term is greater than the DRP entry point, the ECU 70 sets a 'DRP ACTIVE' flag, as shown in block 148, and proceeds to block 144, as shown in FIG. 7.

As shown at blocks 150 and 116, the ECU 70 also receives a temperature input from a dedicated temperature sensor, or from a vehicle data bus, and maintains both a record of the total open time for the release valve during a given braking event, and a record of elapsed time between the subsequent braking events. These values are used for estimating how much of the pressurized volume of fluid is available from the master cylinder 62 during the remainder of the present braking event, and for the first embodiment 50, how much fluid the accumulator 64 is currently holding. The temperature of the fluid and the known fluid flow characteristics of the various components of the rear brake hydraulic circuit 60 are utilized by the ECU 70 for making calculations relating to the amount of fluid that remains available for the present braking event.

If there is not a sufficient volume available of pressurized fluid to perform RPC or DRP as commanded by blocks 136 or 144, the command actually sent to the HCU 68 may be modified, as shown at block 116. If the accumulator 64 has not had sufficient time to completely empty following the preceding braking event, the ECU 70 may enter into DRP sooner to limit the amount of pressurized fluid at the rear brake, in the event that RPC is necessary during that particular braking event.

By estimating the available fluid as shown at block 150 and described above for modifying the commands sent to the HCU 68, the limited amount of pressurized fluid available for a given braking event can be meted out more effectively and efficiently than was the case in prior RWAL systems.

The various components of the RPC 66, such as the ECU 70, HCU 68 and the accumulator 64 may be packaged and mounted in a variety of combinations and locations to suit the needs of a particular vehicle application. For example, the ECU 70 and HCU 68 may be packaged and mounted together as one unit, affixed to the chassis. Alternatively, the ECU 70 and HCU 68 may be packaged separately and mounted remotely from one another, the components and/or functions of the ECU 70 and HCU 68 may be combined with other on-board computers or hydraulic control units. Either the ECU 70 and/or the HCU 68 may also be mounted directly on the master cylinder. These various combinations of the RPC apparatus 66 and others may also be configured to include an accumulator 64, as shown in the first exemplary embodiment 50 of FIG. 5, or to utilize a direct return line 94 between the release valve 92 and the fluid reservoir 104, as shown in the second embodiment 110 of FIG. 6.

Figure 9:
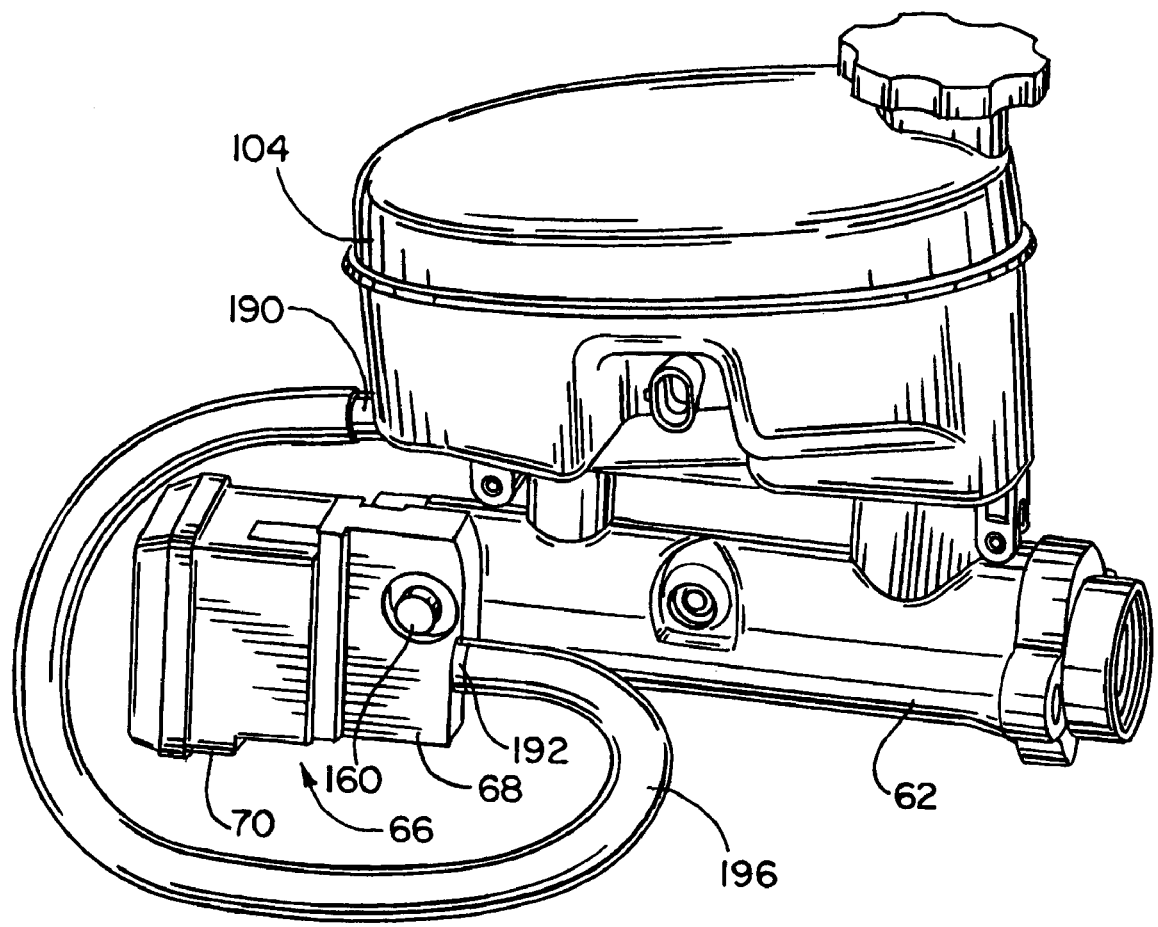
FIG. 9 is a perspective representation of an embodiment of the present invention having an RPC apparatus, according to the present invention, mounted on a master cylinder.

FIG. 9 shows an embodiment of the invention, generally corresponding to the embodiment 110 shown schematically in FIG. 6, in which the RPC apparatus 66 includes an ECU 70 and an HCU 68, integrally joined together, and mounted directly on one of the ports 69 of master cylinder 62, using a hollow fastener 160 with an internal fluid passage, known in the automotive industry as a "banjo bolt." As shown in FIGS. 10–12, the HCU 68 includes a valve block 162 having a through-bore 164 for passage there through of a threaded end 166 of the banjo-bolt 160, for engagement with threads in the master cylinder port 69, connecting the rear brake circuit 60 to the master cylinder 62. The opposite end of the banjo-bolt 160 includes a flanged head 168 that engages and clamps the valve block 162 against the master cylinder 62 when the banjo-bolt 160 is threaded into the threads of the port 69 of the master cylinder 62.

The HCU 68 includes a normally open, solenoid operated, apply valve 86 and a normally closed, solenoid operated, release valve 92 mounted in the valve block 162. The apply and release valves 86, 92 each respectively include an armature stem 172, 174 that extends into one of a corresponding pair of electromagnetic coils (not shown) located in the ECU 70. These coils are in turn connected to electronic circuits within the ECU 70 that apply electrical current to the coils for exerting a force on the armature stems 172, 174 for actuating the apply and release valves 86, 92.

The inlet 88 of the apply valve 86 is located in the end of the apply valve 86 opposite from the armature stem 172, and the outlet 89 of the apply valve 86 is located in the side of the apply valve 86. The inlet 91 of the release valve 92 is located in the side of the release valve 92, and the outlet 93 of the release valve 92 is located in the end of the release valve 92 opposite from the armature stem 174.

The valve block 162 includes a first internal passage 176 connected to the inlet of the apply valve 86. The banjo-bolt 160 further includes a blind internal longitudinal bore 178 extending into the banjo-bolt 160 from its threaded end 166. The longitudinal bore 178 provides fluid communication with the port 69 of the master cylinder 62 and a cross-drilled hole 180 in the banjo-bolt 160 intersecting the longitudinal bore 178 for passage of fluid between the first internal passage 176 of the HCU 68 and the port 69 of the master cylinder 62.

The valve block 162 further includes a threaded rear brake circuit port 182 for connection of the HCU 70 to the rear brake circuit 60. A blind second internal passage 183 of the HCU 70 extends from the rear brake circuit port 182 into the valve body 162 and provides fluid communication between the rear brake circuit port 182, the outlet 89 of the apply valve 86, and the inlet 91 of the release valve 92.

As shown in FIGS. 10 and 11, a pair of fluid seals 184, 186 are provided, one on either side of the outlet 89 of the apply valve 86. The seal 186 located between the outlet 89 and the inlet 88 of the apply valve 86 is a lip seal that functions as a check valve 96 for blocking fluid flow from the inlet 88 to the outlet 89 of the apply valve 86 and allowing fluid to return to the master cylinder 62 past the lip seal 186 from the outlet 89 to the inlet 88 of the apply valve 86. A conventional ball-and-seat check valve arrangement may by substituted for the lip seal to perform the same function.

In similar fashion, a pair of fluid seals 184,188 are provided, one on either side of the inlet 91 of the release valve 92. The seal 188 located between the inlet 91 and the outlet 93 of the release valve 92 is a lip seal that functions as a check valve 98 blocking fluid flow from the inlet 91 to the outlet 93 of the apply valve 92 and allowing fluid to return to the master cylinder 62 past the lip seal 188 from the outlet 93 to the inlet 93 of the apply valve 92. The lip seals 186, 188 are essentially oriented in opposite directions, to correspond with the reversed location of the inlet and outlet ports 91, 93 of the release valve 92 as compared to the inlet and outlet ports 88, 89 of the apply valve 86. A conventional ball-and-seat check valve arrangement may by substituted for the lip seal to perform the same function.

As shown in FIG. 9, the fluid receiving element is a fluid reservoir 104 mounted on the master cylinder 62 for supplying fluid to the master cylinder 62. The fluid reservoir 104 includes a hose connection snorkel 190 for passage of fluid to and from the fluid reservoir 104. The HCU 70 also includes a hose connection snorkel 192, in fluid communication through a third internal passage 194 of the valve block 162 with the outlet 93 of the release valve 92, and a hose 196 connects the snorkels 192, 190 on the HCU 68 and the fluid reservoir 104.

In other embodiments of the invention, such as the embodiment 50 shown in FIG. 5, it may be desirable to mount a valve block 162 to a master cylinder 62 with a banjo-bolt 160 or another type of hollow fastener, as shown in FIGS. 10–12, but to connect the outlet 93 of the release valve 92 to an accumulator 64 mounted in, on, or remotely from the valve block 162, rather than using the fluid reservoir 104 of the embodiment 110 shown in FIG. 9.

While the embodiments of the present invention disclosed herein are presently considered to be preferred, various changes and modifications can be made without departing from the spirit and scope of the invention. The scope of the invention is indicated in the appended claims. It is intended that all changes or modifications within the meaning and range of equivalents are embraced by the claims.

We claim:

1. A pump-less anti-lock brake apparatus for controlling the rotational speeds, during a braking cycle, of only the rear brakes of a vehicle having at least one front and one rear wheel and front and rear brakes acting on the front and rear wheels respectively, the apparatus comprising:
    a rear brake hydraulic circuit including a master cylinder for supplying a volume of pressurized brake fluid to the rear brakes during the braking cycle, a fluid storage element, and a rear brake pressure control (RPC) apparatus;
    the RPC apparatus including a hydraulic control unit (HCU) and an electrical control unit (ECU), with the HCU operatively connecting the master cylinder to the rear brakes and the fluid storage element for controlling fluid pressure applied to the rear brakes during the braking cycle and fluid flow to the fluid storage element, and the ECU operatively connected to the HCU for controlling the HCU as a function of the rotational speeds of the at least one front and one rear wheel.

2. The brake apparatus of claim 1 wherein the RPC apparatus further includes:
    a first wheel speed sensor operatively connected for sensing a speed of the at least one front wheel and sending a front wheel speed signal to the ECU; and
    a second speed sensor operatively connected for sensing a speed of the at least one rear wheel and sending a rear wheel speed signal to the ECU.

3. The brake apparatus of claim 2 wherein the vehicle includes more than one front wheel, the first wheel speed sensor is connected to one of the front wheels; and the RPC apparatus further includes a third wheel sensor connected to one of the other front wheels for sensing the speed of the other front wheel.

4. The brake apparatus of claim 2 wherein the HCU includes:
    a normally open apply valve operatively connected to the ECU to be controlled thereby, and having an inlet connected to the master cylinder for receiving pressurized fluid therefrom and an outlet connected to the rear brakes; and
    a normally closed release valve operatively connected to the ECU to be controlled thereby, and having an inlet connected to the rear brakes for receiving fluid therefrom and an outlet connected to the fluid receiving element.

5. The brake apparatus of claim 4 wherein the ECU calculates a net flow of fluid to the fluid storage element during the braking cycle as a function of an amount of time that the release valve is open during the braking cycle.

6. The brake apparatus of claim 5 wherein:
    the ECU terminates anti-lock control of the rear brakes and returns the apply and release valves to their respective normally open and normally closed states when a predetermined net flaw of fluid to the fluid storage is calculated.

7. The brake apparatus of claim 4 further including:
    a first check valve operatively connected between the inlet and outlet of the apply valve, for blocking fluid flow from the inlet to the outlet of the apply valve, and for passage of flow from the outlet to the inlet of the apply valve; and
    a second check valve operatively connected between the inlet and outlet of the release valve, for blocking fluid flow from the inlet to the outlet of the release valve, and for passage of flow from the outlet to the inlet of the release valve.

8. The brake apparatus of claim 4 wherein the fluid receiving unit is an accumulator.

9. The brake apparatus of claim 8 wherein:
    the ECU calculates a net flow of fluid to the fluid storage element during the braking cycle as a function of an amount of time that the release valve is open during the braking cycle;
    the ECU calculates a net flow of fluid from the fluid storage element subsequent to the braking cycle; and
    modifies its control function to reduce pressure during a subsequent braking cycle if all of the fluid has not exited the fluid storage element prior to initiation of the subsequent braking cycle.

10. The brake apparatus of claim 9 wherein:
    the ECU terminates anti-lock control of the rear brakes and returns the apply and release valves to their respective normally open and normally closed states when a predetermined net flow of fluid to the fluid storage is calculated.

11. The brake apparatus of claim 8 wherein the rear brake hydraulic circuit further includes a proportioning valve operatively connected between the rear brake circuit and the front brakes.

12. The brake apparatus of claim 4 wherein the fluid receiving element is a fluid reservoir supplying fluid to the master cylinder.

13. The brake apparatus of claim 12 further including a fluid level sensor operatively connected for sensing a level of the fluid in the reservoir and sending a signal to the ECU indicative of the level of the fluid in the reservoir.

14. The brake apparatus of claim 4 wherein the vehicle includes a drivetrain having a transmission for supplying motive power to the rear wheels and the second speed sensor is operatively connected for sensing a speed of an element of the transmission.

15. The brake apparatus of claim 4 wherein the vehicle includes a drivetrain having a differential for supplying motive power to the rear wheels and the second speed sensor is operatively connected for sensing a speed of an element of the differential.

16. The brake apparatus of claim 4 wherein the HCU is mounted on the master cylinder.

17. The brake apparatus of claim 16 wherein the ECU is mounted on the master cylinder.

18. The brake apparatus of claim 16 wherein:
the master cylinder includes a threaded port for connecting the master cylinder to the rear brake hydraulic system; and
the HCU includes an internal passage connected to the inlet of the inlet valve, and the HCU is mounted on the master cylinder with a hollow fastener extending through the internal passage of the HCU and engaging the threaded port;
the hollow fastener having an internal bore providing fluid communication with the master cylinder and a cross-drilled hole intersecting the internal bore for passage of fluid to and from the internal passage of the HCU.

19. The brake apparatus of claim 18 wherein the ECU is mounted on the HCU.

20. The brake apparatus of claim 18 wherein the fluid receiving element is an accumulator disposed in the HCU in fluid communication with the outlet of the release valve.

21. The brake apparatus of claim 20 wherein the ECU is mounted on the HCU.

22. The brake apparatus of claim 18 wherein the fluid receiving element is a fluid reservoir mounted on the master cylinder for supplying fluid to the master cylinder, and the outlet of the release valve is connected in fluid communication with the fluid reservoir.

23. The brake apparatus of claim 22 wherein the ECU is mounted on the HCU.

24. The brake apparatus of claim 22 wherein:
the fluid reservoir includes a hose connection snorkel for passage of fluid to and from the fluid reservoir;
the ECU includes a hose connection snorkel in fluid communication with the outlet of the release valve of the HCU; and
a hose connects the snorkels on the ECU and the fluid reservoir.

25. The brake apparatus of claim 24 wherein the ECU is mounted on the HCU.

26. The brake apparatus of claim 1 wherein the function of rotational speed used by the ECU for controlling the HCU includes:
calculating a vehicle speed (VS Est) as a function of the front wheel speed; and
comparing the rotational speed of the rear wheel to the vehicle speed.

27. The brake apparatus of claim 1 wherein the ECU further controls the HCU as a function of the fluid flow to the fluid storage element during the braking cycle.

28. The brake apparatus of claim 1 wherein the ECU further controls the HCU as a function of a net fluid flow to the fluid storage element during the braking cycle and prior to a subsequent braking cycle.

29. The brake apparatus of claim 1 wherein the master cylinder includes a movable piston for supplying the volume of pressurized brake fluid to the rear brake hydraulic circuit, and the control system further includes a brake apply position sensor operatively connected between the piston and the ECU for sensing a position of the piston and supplying a piston position signal to the ECU.

30. A rear brake pressure control (RPC) apparatus for a rear brake hydraulic circuit including a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having at least one front wheel and at least one rear wheel, and front and rear brakes acting on the front and rear wheels respectively, the RPC apparatus comprising:
a hydraulic control unit (HCU) operatively connecting the master cylinder to the rear brakes and the fluid storage element for controlling fluid pressure applied to the rear brakes during the braking cycle and fluid flaw to and from the fluid storage element; and
an electrical control unit (ECU) operatively connected to the HCU for controlling the HCU as a function of the rotational speeds of at least one front and one rear wheel.

31. The RPC apparatus of claim 30 further comprising:
a first wheel speed sensor operatively connected for sensing a speed of one of the at least one front wheels and sending a front wheel speed signal to the ECU; and
a second speed sensor operatively connected for sensing a speed of at least one of the at least one rear wheels and sending rear wheel speed signal to the ECU.

32. The RPC apparatus of claim 31 wherein the vehicle includes at least one left and one right front wheel:
the first wheel speed sensor is connected to one of the left or right front wheels; and
the RPC apparatus further comprises a third wheel sensor connected to the other of the left and right front wheels for sensing the speed of the other of the left and right front wheels.

33. The RPC apparatus of claim 30 wherein the master cylinder includes a movable piston for supplying the volume of pressurized brake fluid to the rear brake hydraulic circuit, and the RPC apparatus further includes a brake apply position sensor operatively connected between the piston and the ECU for sensing a position of the piston and supplying a piston position signal to the ECU.

34. The RPC apparatus of claim 30 wherein the HCU includes:
a normally open apply valve operatively connected to the ECU to be controlled thereby, and having an inlet connected to the master cylinder for receiving pressurized fluid therefrom and an outlet connected to the rear brakes; and
a normally closed release valve operatively connected to the ECU to be controlled thereby, and having an inlet connected to the rear brakes for receiving fluid therefrom and an outlet connected to the fluid receiving element.

35. The RPC apparatus of claim 34 wherein the rear brake pressure control unit is mounted on the master cylinder.

36. The RPC apparatus of claim 35 wherein:
the master cylinder includes a threaded port for connecting the master cylinder to the rear brake hydraulic system; and
the HCU includes an internal passage connected to the inlet of the apply valve, and the HCU is mounted on the master cylinder with a hollow fastener extending through the internal passage of the HCU and engaging the threaded port;
the hollow fastener having an internal bore providing fluid communication with the master cylinder and a cross-drilled hole intersecting the internal bore for passage of fluid to and from the internal passage of the HCU.

37. The RPC apparatus of claim 36 wherein the fluid storage element is a fluid reservoir mounted on the master cylinder for supplying fluid to the master cylinder, and the outlet of the release valve is connected in fluid communication with the fluid reservoir.

38. The RPC apparatus of claim 37 wherein:
the fluid reservoir includes a hose connection snorkel for passage of fluid to and from the fluid reservoir;
the HCU includes a hose connection snorkel in fluid communication with the outlet of the release valve; and
a hose connects the snorkels on the HCU and the fluid reservoir.

39. The RPC apparatus of claim 35 wherein the fluid storage element is an accumulator disposed in the HCU in fluid communication with the outlet of the release valve.

40. The RPC apparatus of claim 30 wherein the fluid storage unit is an accumulator disposed in the HCU.

41. The RPC apparatus of claim 30 wherein the fluid storage element is a fluid reservoir supplying fluid to the master cylinder.

42. The RPC apparatus of claim 41 further including a fluid level sensor operatively connected for sensing a level of the fluid in the reservoir and sending a signal to the ECU indicative of the level of the fluid in the reservoir.

43. A method for controlling a rear brake hydraulic circuit having a fluid storage element and a master cylinder supplying a volume of pressurized brake fluid to the rear brakes during the biting cycle in a pump-less anti-lock brake apparatus controlling the rotational speeds, during a braking cycle, of only the rear brakes of a vehicle having at least one front wheel, at least one rear wheel, and front and rear brakes acting on the front and rear wheels respectively, the method comprising:
controlling fluid pressure and flow from the master cylinder applied to the rear brakes during the braking cycle and fluid flow to and from the fluid storage element as a function of the rotational speeds of at least one front and one rear wheel.

44. The method of claim 43 further comprising:
blocking the flow of pressurized fluid to the fluid storage element prior to detecting an impending lack up of the rear brakes; and
controlling the fluid pressure in the rear brake circuit only after detecting an impending lock up of the rear brakes.

45. The method of claim 43 wherein the function of rotational speed used by the ECU for controlling the fluid pressure applied to the rear brakes comprises:
determining a reference speed of the vehicle from the rotational speeds of the at least one front wheel; and
comparing the rotational speed of the rear wheel to the reference vehicle velocity for detecting a slippage of the rear wheels.

46. The method of claim 43 further comprising controlling the fluid pressure applied to the rear brakes as a function of fluid flow to the fluid storage element during the braking cycle.

47. The method of claim 46 comprising returning fluid in the fluid storage element to the rear brake circuit following completion of the braking event.

48. The method of claim 47 further comprising controlling the fluid pressure applied to the rear brakes as a function of a net fluid flow to the fluid storage element during the braking cycle and prior to a subsequent braking cycle.

49. The method of claim 43 further comprising:
connecting an inlet of a normally open apply valve to the master cylinder for receiving pressurized fluid therefrom, and connecting an outlet of the normally open apply valve to the rear brakes;
connecting an inlet of a normally closed release valve to the rear brakes for receiving fluid therefrom, and connecting an outlet of the normally closed release valve to the fluid receiving element; and
controlling fluid pressure applied to the rear brakes during the braking cycle and fluid flow to and from the fluid storage element by selectively opening and closing the apply and release valves as a function of the rotational speeds of at least one front and one rear wheel.

50. The method of claim 49 further comprising calculating a net flow of fluid to the fluid storage element during the braking cycle as a function of an amount of time that the release valve is open during the braking cycle.

51. The method of claim 50 further comprising terminating anti-lock control of the rear brakes and returning the apply and release valves to their respective normally open and normally closed states when a predetermined net flow of fluid to the fluid storage is calculated.

52. The method of claim 43 wherein the vehicle is operable in a four-wheel drive mode, and the method further comprises inhibiting control of both the fluid pressure applied to the rear brakes during the braking cycle and the fluid flow to and from the fluid storage element as a function of the rotational speeds of at least one front and one rear wheel, while the vehicle is operating in the four wheel drive mode.

53. A method for providing rear pressure control (RPC) for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having at least one front wheel, at least one rear wheel, and front and rear brakes acting on the front and rear wheels respectively, the method comprising:
monitoring the front wheel speed;
monitoring the rear wheel speed;
calculating a vehicle speed (VS Est) as a function of the front wheel speed;
calculating an RPC entry point as a function of vehicle speed (VS Est);
calculating an RPC term as a function of vehicle speed and rear wheel speed; and
controlling the rear brake circuit as a function of the RPC term and RPC entry point.

54. The method of claim 53 further comprising:
determining a road surface condition; and
modifying the RPC entry point as a function of the road surface condition.

55. The method of claim 54 comprising determining the road surface condition as a function of variations in at least one of the front and rear wheel speeds.

56. The method of claim 53 wherein the RPC term is calculated as the proportional and derivative difference between VS Est and the rear wheel speed.

57. The method of claim 53 further comprising controlling the rear brake circuit to provide dynamic rear proportioning (DRP) of brake pressure supplied by the master cylinder.

58. The method of claim 57 wherein DRP is provided as a function of front wheel speed.

59. The method of claim 58 further comprising calculating a DRP term as a proportional and derivative difference between the front wheel speed and the rear wheel speed.

60. The method of claim 59 further comprising calculating a DRP entry point as a function of the vehicle speed estimate (VS Est).

61. The method of claim 53 further comprising controlling the rear brake circuit as a function of a predetermined volume of fluid supplied by the master cylinder during the braking cycle.

62. The method of claim 53 further comprising controlling the rear brake circuit as a function of a flow of fluid to the fluid storage device.

63. A method for providing dynamic rear proportioning (DRP) for controlling a rear brake hydraulic circuit having a fluid storage element and a master cylinder supplying a volume of pressurized brake fluid to the rear brakes during the braking cycle in a pump-less anti-lock brake apparatus controlling the rotational speeds, during a braking cycle, of only the rear brakes of a vehicle having at least one front wheel, at least one rear wheel, and front and rear brakes acting on the front and rear wheels respectively, the method comprising:

monitoring the front wheel speed;

monitoring the rear wheel speed;

calculating a vehicle speed (VS Est) as a function of the front wheel speed;

calculating a DRP entry point as a function of vehicle speed (VS Est);

calculating a DRP term as a function of front wheel speed and rear wheel speed; and controlling the rear brake circuit as a function of the DRP term and DRP entry point.

64. The method of claim 63 further comprising calculating the DRP term as a proportional and derivative difference between the front wheel speed and the rear wheel speed.

65. The method of claim 63 further comprising providing rear pressure control (RPC) of the rear brake circuit.

66. The method of claim 65 further comprising:

calculating an RPC entry point as a function of vehicle speed (VS Est);

calculating an RPC term as a function of vehicle speed and rear wheel speed; and controlling the rear brake circuit as a function of the RPC term and RPC entry point.

67. The method of claim 66 wherein the RPC term is calculated as the proportional and derivative difference between VS Est and the rear wheel speed.

68. The method of claim 66 further comprising:

determining a road surface condition; and modifying the RPC entry point as a function of the road surface condition.

69. The method of claim 68 comprising determining the road surface condition as a function of variations in at least one of the front and rear wheel speeds.

70. The method of claim 63 further comprising controlling the rear brake circuit as a function of a predetermined volume of fluid supplied by the master cylinder during the braking cycle.

71. The method of claim 63 further comprising controlling the rear brake circuit as a function of a flow of fluid to the fluid storage device.

* * * * *